United States Patent
Kerr et al.

(10) Patent No.: US 11,023,516 B2
(45) Date of Patent: Jun. 1, 2021

(54) DISCOVERING MEDIA CONTENT USING NATURAL LANGUAGE PROCESSING AND MACHINE LEARNING

(71) Applicant: International Business Machines Corporation, Armonk, NY (US)

(72) Inventors: Robert R. Kerr, Fitzroy (AU); Filiz Isabell Kiral-Kornek, Collingwood (AU); Adam J. Makarucha, Altona Meadows (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 942 days.

(21) Appl. No.: 15/272,591

(22) Filed: Sep. 22, 2016

(65) Prior Publication Data

US 2018/0081963 A1    Mar. 22, 2018

(51) Int. Cl.
| | | |
|---|---|---|
| *G06F 17/00* | (2019.01) | |
| *G06F 16/48* | (2019.01) | |
| *G06F 16/335* | (2019.01) | |
| *G06F 16/9535* | (2019.01) | |

(52) U.S. Cl.
CPC ............ *G06F 16/48* (2019.01); *G06F 16/335* (2019.01); *G06F 16/9535* (2019.01)

(58) Field of Classification Search
None
See application file for complete search history.

(56) References Cited

U.S. PATENT DOCUMENTS

| | | |
|---|---|---|
| 6,266,649 B1 | 7/2001 | Linden et al. |
| 8,918,409 B2 | 12/2014 | Prosser et al. |
| 8,977,573 B2 * | 3/2015 | Daya ............... G06Q 50/01 705/319 |
| 2016/0012818 A1 * | 1/2016 | Faizakof ........... G10L 15/063 704/245 |

FOREIGN PATENT DOCUMENTS

| | | |
|---|---|---|
| CN | 103744981 A | 4/2014 |
| GB | 2528030 A | 1/2016 |
| WO | 2016007792 A1 | 1/2016 |

OTHER PUBLICATIONS

Hughes et al. Quantitative Patterns of Stylistic Influence in the Evolution of Literature. Sep. 2011 (Year: 2011).*

(Continued)

*Primary Examiner* — Tuankhanh D Phan
(74) *Attorney, Agent, or Firm* — Cantor Colburn LLP; Joseph Petrokaitis (57) ABSTRACT

Embodiments are directed to a computer implemented method of analyzing media files to improve the presentation of media files to users. The method includes using a processor to analyze a set of media files. The media files are represented by a set of vectors according to characteristics of each media file. A set of preferences is gathered for a user. A configuration from the user is then obtained. The media file vectors are adjusted based on the preferences and configuration. The media files are selected for presentation to the user based on the user's preferences and configuration.

17 Claims, 6 Drawing Sheets

(56) References Cited

OTHER PUBLICATIONS

Kardan et al., "A novel approach to hybrid recommendation systems based on association rules mining for content recommendation in asynchronous discussion groups", Information Sciences 219, 2013, pp. 93-110.
Le et al., "Distributed Representations of Sentences and Documents", 2014, http://arxiv.org/abs/1405.4053.
Niu et al., "Topic2Vec: Learning Distributed Representations of Topics", 2015, http://arxiv.org/abs/1506.08422.
Pazzani et al., "Content-Based Recommendation Systems", The Adaptive Web, LNCS 4321, 2007, pp. 325-341.
Stalidis et al., "Machine Learning Sentiment Prediction based on Hybrid Document Representation", 2015, http://arxiv.org/abs/1511.09107.
Wang et al., "Applicability of Demographic Recommender System to Tourist Attractions: A Case Study on Trip Advisor", 2012 IEEE/WIC/ACM International Conferences on Web Intelligence and Intelligent Agent Technology, 2012, pp. 97-101.
Yuan et al., "A New Study Based on Word2vec and Cluster for Document Categorization", Journal of Computational Information Systems 10: 21, 2014, pp. 9301-9308.

\* cited by examiner

DISCOVERING MEDIA CONTENT USING NATURAL LANGUAGE PROCESSING AND MACHINE LEARNING

BACKGROUND

The embodiments described herein relate in general to the field of internet searching. More specifically, the embodiments described herein relate to systems and methodologies for improving the discovery of online content.

There are many manners in which users can locate content online. One popular method is the use of search engines, which allow a user to search for specific content in which the user is interested. Another popular method is browsing curated content, in which a user views content aggregated by a trusted source (such as a news organization). An increasingly popular method is viewing content based on comparison with others. Metrics used for the comparison can include friends or other contacts who liked content, content similar to that liked before, and the like.

SUMMARY

Embodiments are directed to a computer-implemented method of allowing the discoverability of media files. The method includes analyzing, using a processor, a set of media files. Each media file in the set of media files is represented as a media file vector according to characteristics of each media file. A set of preferences is determined for a user. A configuration is received from the user. Each media file vector is shifted based on the set of preferences and the configuration. One or more media files from the set of media files are selected for presentation to the user based on the user's preferences and configuration.

Embodiments are further directed to a computer system for improving a query. The system includes a memory and a processor system communicatively coupled to the memory. The processor is configured to perform a method that includes analyzing, using a processor, a set of media files. Each media file in the set of media files is represented as a media file vector according to characteristics of each media file. A set of preferences is determined for a user. A configuration is received from the user. Each media file vector is shifted based on the set of preferences and the configuration. One or more media files from the set of media files are selected for presentation to the user based on the user's preferences and configuration.

Embodiments are further directed to a computer program product for improving a query. The computer program product includes a computer-readable storage medium having program instructions embodied therewith, wherein the computer-readable storage medium is not a transitory signal per se. The program instructions are readable by a processor system to cause the processor system to perform a method that includes analyzing, using a processor, a set of media files. Each media file in the set of media files is represented as a media file vector according to characteristics of each media file. A set of preferences is determined for a user. A configuration is received from the user. Each media file vector is shifted based on the set of preferences and the configuration. One or more media files from the set of media files are selected for presentation to the user based on the user's preferences and configuration.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

In the accompanying figures and following detailed description of the disclosed embodiments, the various elements illustrated in the figures are provided with three digit reference numbers. The leftmost digits of each reference number corresponds to the figure in which its element is first illustrated.

DETAILED DESCRIPTION

Various embodiments of the present invention will now be described with reference to the related drawings. Alternate embodiments can be devised without departing from the scope of this invention. Various connections might be set forth between elements in the following description and in the drawings. These connections, unless specified otherwise, can be direct or indirect, and the present description is not intended to be limiting in this respect. Accordingly, a coupling of entities can refer to either a direct or an indirect connection.

Additionally, although a detailed description of a computing device is presented, configuration and implementation of the teachings recited herein are not limited to a particular type or configuration of computing device(s). Rather, embodiments are capable of being implemented in conjunction with any other type or configuration of wireless or non-wireless computing devices and/or computing environments, now known or later developed.

Furthermore, although a detailed description of discovery algorithms is included herein, implementation of the teachings recited herein are not limited to embodiments described herein. Rather, embodiments are capable of being implemented in conjunction with any other type of searching system, now known or later developed.

At least the features and combinations of features described in the immediately present application, including the corresponding features and combinations of features depicted in the figures amount to significantly more than implementing a method of allowing the discovery of media content in a particular technological environment. Additionally, at least the features and combinations of features described in the immediately preceding paragraphs, including the corresponding features and combinations of features depicted in the figures go beyond what is well understood, routine and conventional in the relevant field(s).

As discussed above, existing recommendations of media content are often based on a variety of different factors. For example, the Facebook™ or Twitter™ or Google™ News feed of a user is based on content that the user has viewed and approved in the past. Content will be recommended to a user based on who they follow, who their contacts are, the type of content that they have "liked" in the past, and the like.

The recommended videos on Netflix™ or Youtube™ or similar video distribution sites can be based on a combination of previous videos the user has watched or liked and algorithms that predict videos that the user would enjoy based on experiences. Similar recommendations are present in many other fields, such as gaming, TV shows, music, and the like.

The echo chamber effect is that a user might not experience a wide variety of media content due to these recommendations. While a user with no history might be recommended a large variety of different media, a user with extensive history or many friends or similar users can have a limited number of options. To take a specific example, if a user has watched or recommended action movies in the past, it is more likely that the user will be recommended action movies in the future. While that can be preferable in some instances (e.g., the user might really like action movies and only want to view action movies), it also can be limiting (e.g., the user might not always want to watch action movies).

Another area in which the echo chamber effect can be even more important is politics. If a user indicates a preference for a particular candidate or position (or if their contacts do so), the user might be exposed only to candidates or positions with which they agree. This effect can be seen on the Wall Street Journal site, Red Feed, Blue Feed, in which the Facebook feed for a "conservative" person is compared to that of a "liberal" person. While this situation can be preferable for some users, the end-result can be an increasingly polarized electorate, with each side of an issue not completely aware of the positions of the other side of the issue.

Figure 1A:
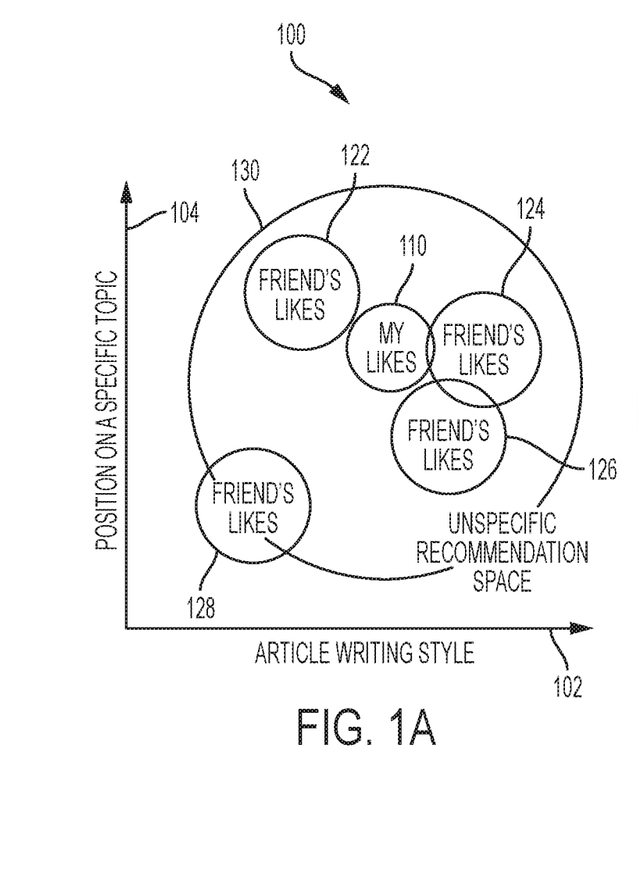
FIG. 1A depicts a Venn diagram illustrating an exemplary new user's social media recommendations.
Figure 1B:
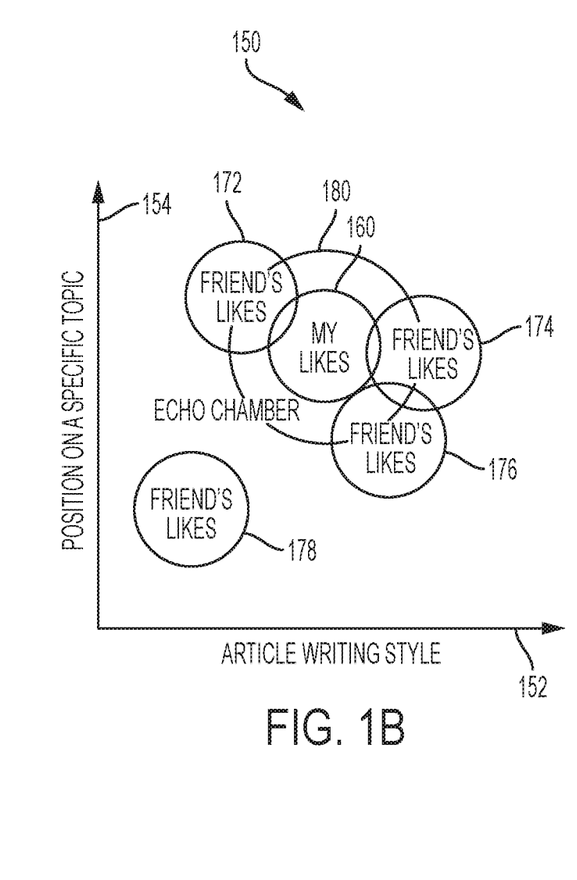
FIG. 1B depicts a Venn diagram illustrating an exemplary user's social media recommendations after a period of time.

The above examples are illustrated in Venn diagrams in FIGS. 1A and 1B. With reference to FIG. 1A, an exemplary Venn diagram 100 is presented of a new user's interests with respect to written articles. If a user has no history at a particular site, the recommendation space can be quite large. X-axis 102 represents the writing style of the articles. Y-axis 104 represents the position or point of view of an article regarding a specific topic. This particular example will be in reference to a social media site in which a user has contacts, also known as "friends" in this example. While this embodiment is illustrated with respect to a social media or social networking site, other use cases are also possible.

A user's likes 110 starts off relatively small as they join a particular social network. The likes of their friends (elements 122, 124, 126, and 128) all occur at some point along X-axis 102 and Y-axis 104. These "likes" are used to represent articles for which the user has indicated approval. This can be in the form of posting or commenting on the media in some embodiments, or following a link to article in some embodiments.

Element 130 represents articles that are recommended to the user based on the likes of the user and his four friends. (It should be understood that this example can be expanded to include hundreds or thousands or even more friends, but only four are shown in this example.)

The way to interpret the diagram is that element 128 represents the articles that have been "liked" by a particular friend or contact of user 110. This friend likes articles with a certain point of view and in a certain style. The same is true for elements 122, 124, and 126 and three other friends or contacts.

As time progresses, the user has more interactions with his friends and reads more articles and consumes more media. The recommended articles shrink as the known preferences of the user becomes better known. This effect is illustrated in Venn diagram 150 of FIG. 1B. Elements 152 and 154 are the X-axis and Y-axis respectively. User's likes 160 change as the user interacts more with the site. The "likes" of the user's friends are represented by elements 172, 174, and 176. For purposes of illustration, they are illustrated as being the same as elements 122, 124, 126, and 128. However, it should be understood that these likes also can change over time.

In traditional systems, the user's recommendations 180 converge among his previous likes and interactions (also known as his preferences). Here, you can see that user is recommended content that overlaps with his friends 172, 174, and 176. If you stayed exposed to the content of friends 172, 174, and 176, it is likely that you shared the same opinion in the first place. However, because the user's past likes and interactions do not overlap with that of friend 178, the user no longer sees recommendations that are based on friend 178. This effect can be unimportant in some cases (e.g., the user might not be close to friend 178 and simply not read their updates.) However, it can lead to aforementioned "echo chamber" effect in which viewpoints and contents recommended or liked by friend 178 are simply never seen in recommendations 180.

Embodiments of the present invention address the above-described issues by using a novel machine-learning algorithm for analyzing aspects of the media content rather than only using social meta-data. Embodiments use rich automated content-derived labeling of documents to provide a better end user experience. In addition, a user can adjust content dimensions to more accurately reflect the user's interests and preferences and expose the user to a wide variety of media. The processes described herein are extendible to a wide variety of different types of media.

Figure 2A:
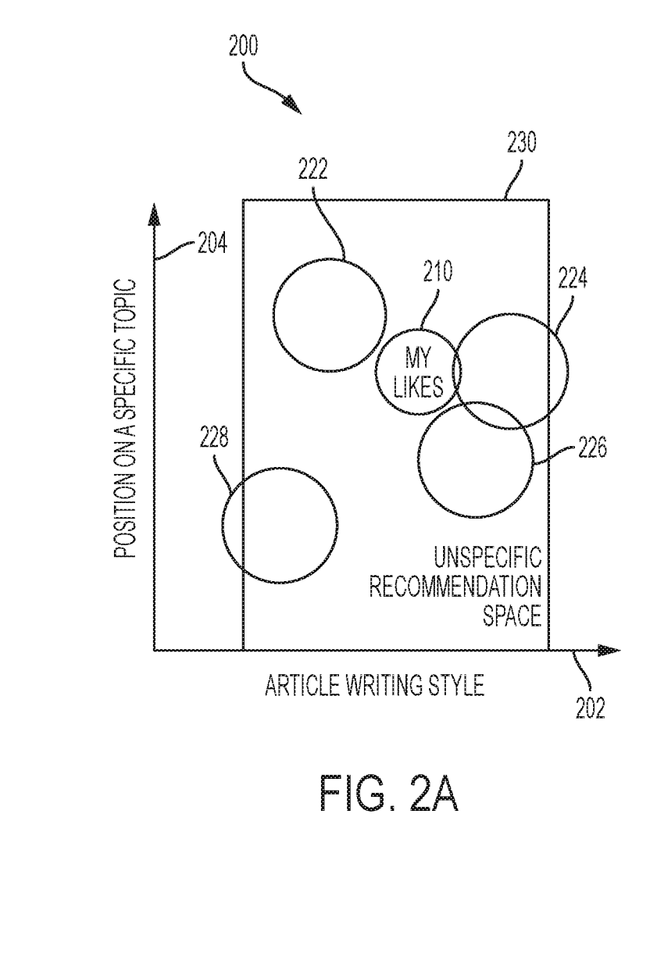
FIG. 2A depicts a Venn diagram illustrating an exemplary new user's recommendations using an embodiment of the present invention.
Figure 2B:
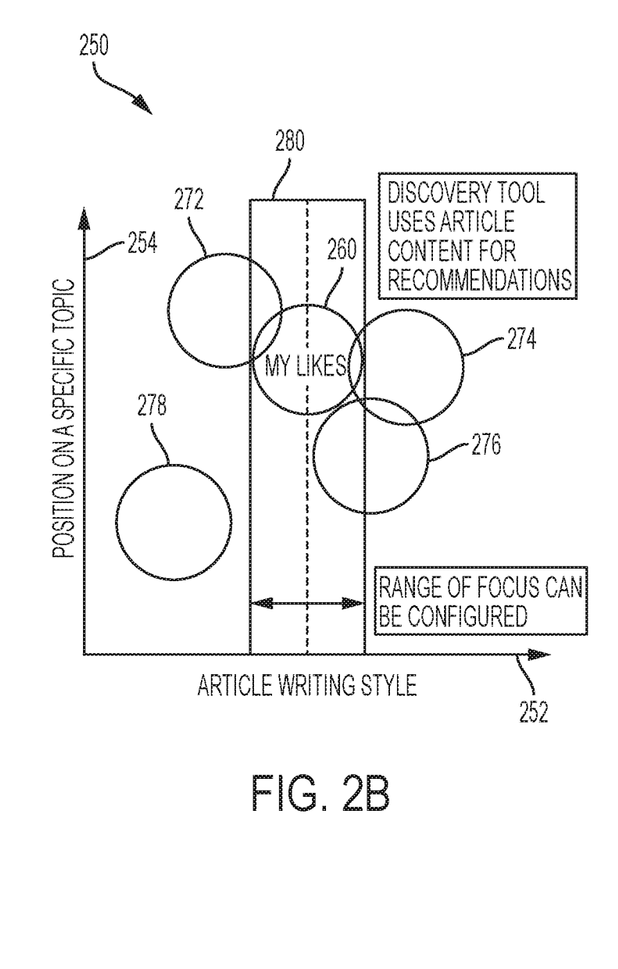
FIG. 2B depicts a Venn diagram illustrating the exemplary user's recommendations using an embodiment of the present invention after a period of time.

With reference to FIGS. 2A and 2B, figures similar to that of FIGS. 1A and 1B are presented. Venn diagram 200 includes X-axis 202 to represent the writing style of the articles. Y-axis 204 represents the position (or point of view) of an article regarding a specific topic. A user's "likes" 210 start relatively small as they join a particular social network. The likes of their friends (elements 222, 224, 226, and 228) all occur at some point along X-axis 202 and Y-axis 204. One difference is element 230, which represents articles and media that are recommended to the user based on the likes of the user and his four friends.

In FIGS. 2A and 2B, rather than (or in addition to) recommendations 230 being based around a user's current interests, the recommendations 230 can be adjusted by the user. In FIG. 2A, because the user is new, a default recommendation area might include a relatively large area of content. However, the recommendation area can be adjusted by the user. An exemplary user adjustment is illustrated in FIG. 2B. While the range of recommendations can still be dependent upon the interests of the user, a wider variety of sources can be displayed to the user for discovery purposes.

As shown in Venn diagram 250 FIG. 2B, elements 252 and 254 are the X-axis and Y-axis respectively. User's likes 260 change as the user interacts more with the site. The likes of the user's friends are represented by elements 272, 274, and 276. For purposes of illustration, they are illustrated as being the same as elements 222, 224, 226, and 228. However, it should be understood that these can also change over time.

The user's recommendations 280 converge among his previous likes and interactions. However, a user also has the option to manually set a range of focus for recommended content. This can be termed the user's configuration. In FIG. 2B, the user might narrow the writing style of the articles being displayed to him.

Writing style can mean one of a variety of different metrics. For example, writing style can mean the complexity of an article. A Flesch-Kincaid readability test can be one metric used to measure complexity. A Flesch-Kincaid reading grade level indicates an estimate of the grade level needed to understand an article. Other metrics, such as Flesch reading ease scores and the like, also can be used. Length of an article also can be determined and used to limit recommended content. Some users might prefer longer, more in-depth articles, while others prefer shorter summaries of articles. As shown in FIG. 2B, this particular user narrowed the style of writing to meet his likes (represented by X-axis 252), but the user did not narrow his point of view. Thus, the user has chosen to keep writing style and article topics the same, but has chosen to be exposed to a wider variety of opinions (represented by Y-axis 254).

The user is thus able to choose document dimensions that they want to be the same and dimensions that they want to be different. For example, the user is able to instruct an embodiment to return media files that have a suitable language level (determined from previously viewed media files), but show me arguments both for and against its existence (as opposed to the content that the user is typically opposed to).

Figure 3:
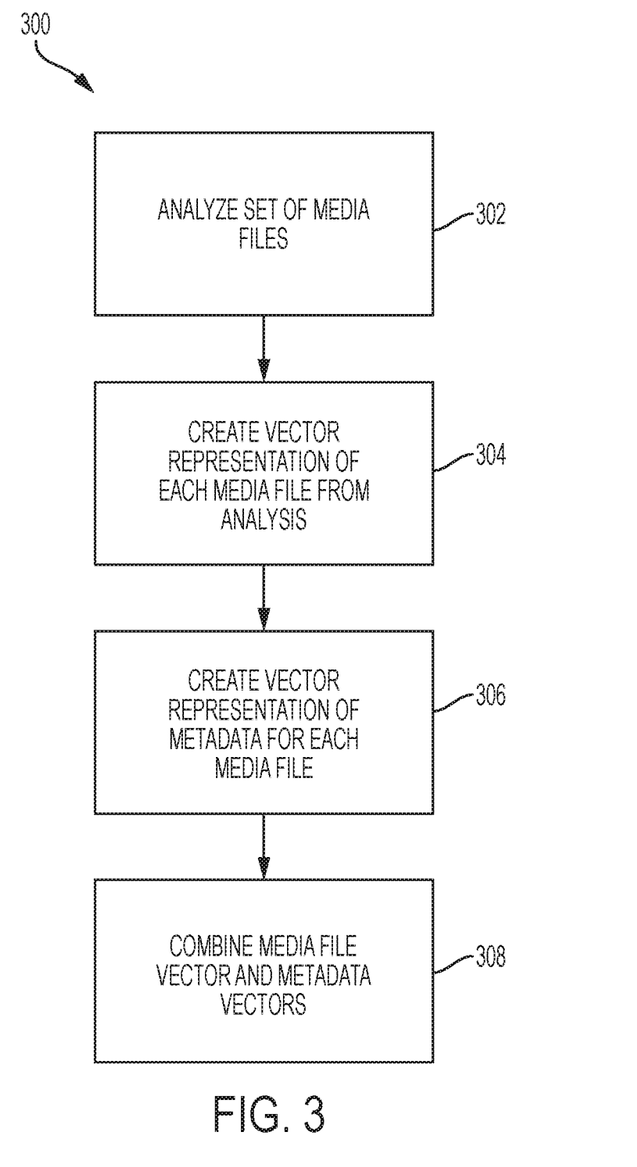
FIG. 3 depicts a flowchart illustrating the operation of an embodiment of the present invention.
Figure 5:
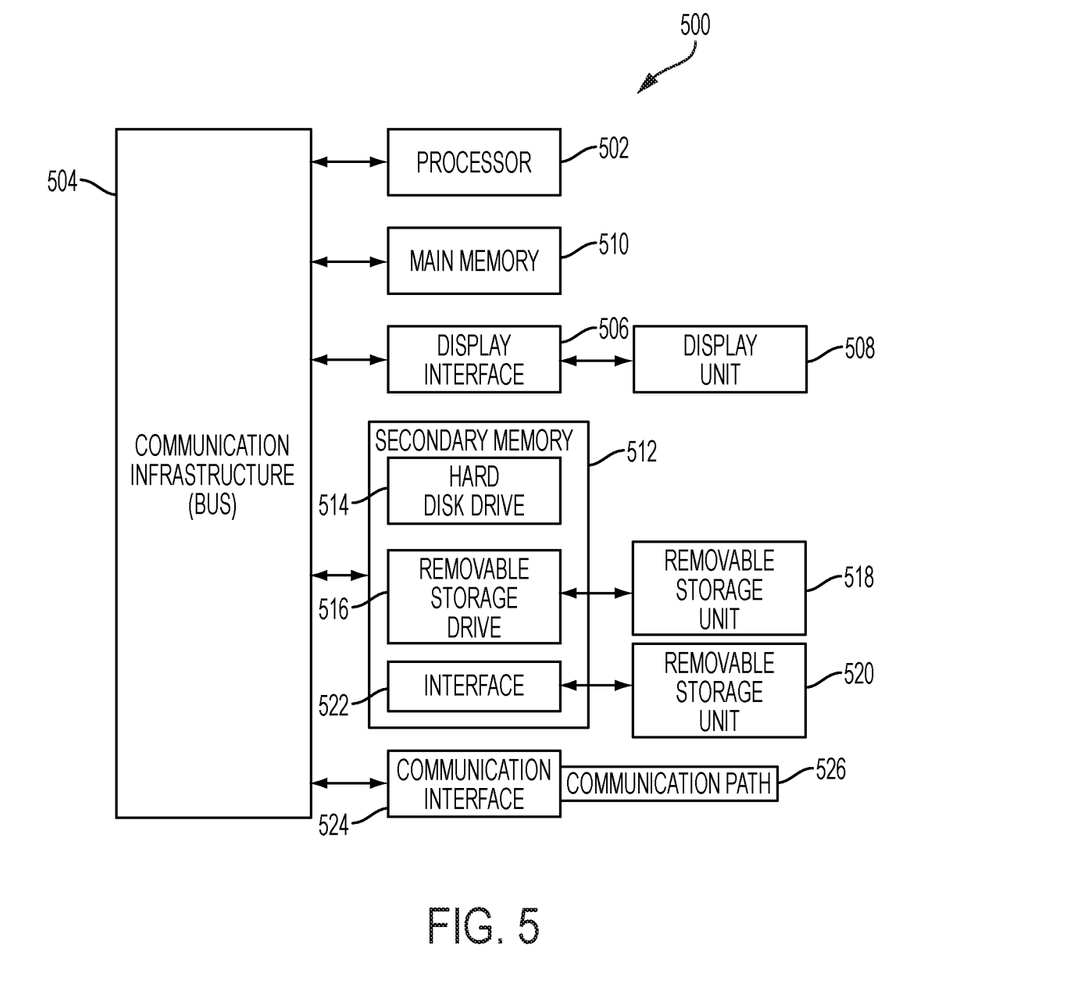
FIG. 5 depicts a computer system capable of implementing hardware components of one or more embodiments.

A flowchart illustrating a method 300 of implementing such an algorithm is presented in FIG. 3. Method 300 is merely exemplary and is not limited to the embodiments presented herein. Method 300 can be employed in many different embodiments or examples not specifically depicted or described herein. In some embodiments, the procedures, processes, and/or activities of method 300 can be performed in the order presented. In other embodiments, one or more of the procedures, processes, and/or activities of method 300 can be combined or skipped. In some embodiments, portions of method 300 can be implemented by computer system 500 (FIG. 5).

Method 300 is a brief overview of an exemplary process of training or categorizing documents or media. A large set of documents or media files is "crawled" or analyzed (block 302). The set of media is relevant to the system at issue. For example, a system being operated by a video distribution company will crawl movies and other videos. A system being operated by an audio distribution company will crawl music and other audio files. A system being operated by a news aggregator will crawl articles and other written media. Other systems are more generalized and can analyze a wide variety of sources.

Machine learning methods are performed to represent each document (or video file or audio file, as the case may be) in a vector space that is common to all documents. Each document is labeled with vector dimensions (block 304).

There can be a vector to represent various aspects of each document, such as the language difficulty (such as the aforementioned Flesch-Kincaid readability score and the like), domain (the subject of the article), the sentiment of the article (is the article largely positive or largely negative), writing style (e.g., straight reporting vs storytelling), tone (e.g., comedic or serious), approach, techniques (e.g., the use of jargon), argument style, topic, opinion, and the like. This information can be gathered from an analysis of the document that analyzes the text of a document and compares the analysis to other analyses performed in the past. A machine-learning algorithm can be used to provide increasingly better analyses of each document being analyzed.

Metadata can be gathered for each document and stored as a vector (block 306). The metadata can contain a wide variety of different information about the document. Exemplary information can include the author, title, publisher, date, and other bibliographic information.

Metadata vectors and document vectors are combined and stored (block 308). Thereafter, the database of vectors can be used in an embodiment.

While the above description refers to document and articles, it should be understood that embodiments also can be used with any type of written work, including, but not limited to articles, books, editorials, abstracts, screenplays, research papers, and the like.

Embodiments also can be used with visual or audio media. Automated procedures can be used with some such media. For example, technology that analyzes a musical work and determines the artist and work is known in the art. Technology that analyzes an image to find similar images or perform facial recognition is known in the art. Technology that analyzes a video file to find similar video files is known in the art. Once the work is known, metadata associated with the visual or audio media can be used for categorization purposes. For example, the year the media was created, the studio that made or distributed the work, the genre of the work, the timing of the work, and the like can all be used for categorization purposes.

Figure 4:
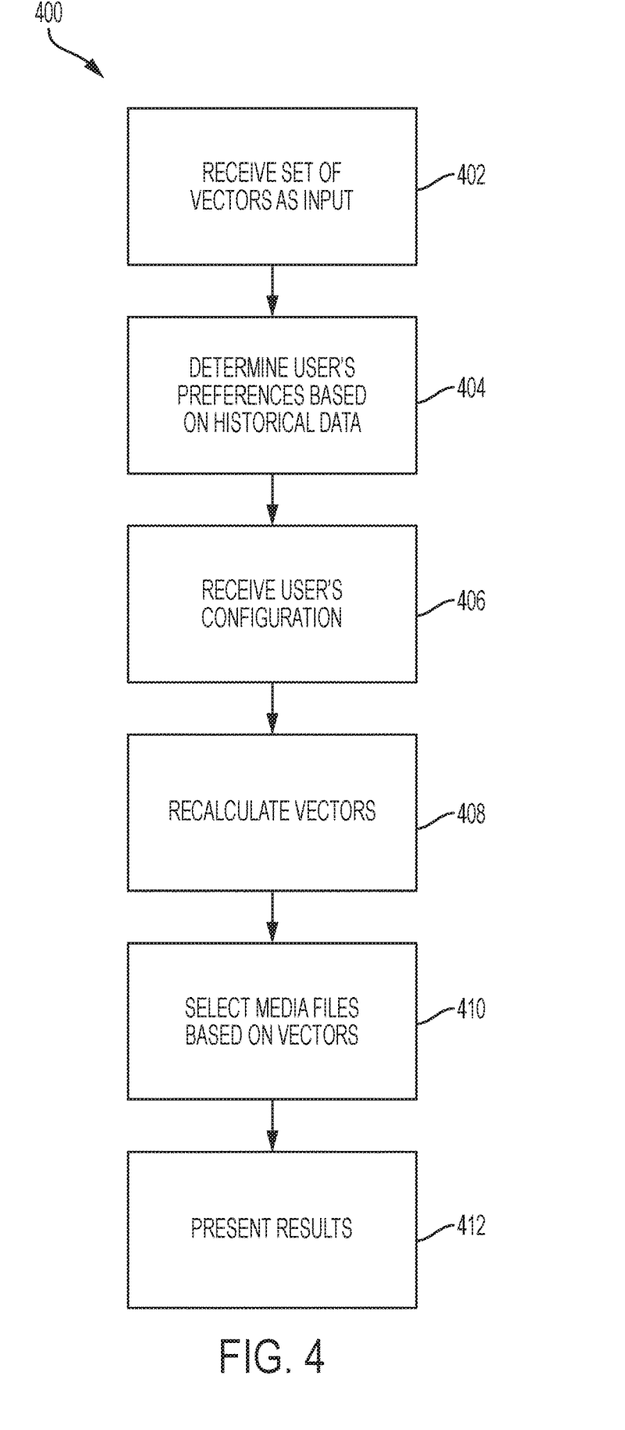
FIG. 4 depicts a flowchart illustrating the operation of an embodiment of the present invention.

With reference to FIG. 4, method 400 illustrates the operation of an exemplary embodiment. Method 400 is merely exemplary and is not limited to the embodiments presented herein. Method 400 can be employed in many different embodiments or examples not specifically depicted or described herein. In some embodiments, the procedures, processes, and/or activities of method 400 can be performed in the order presented. In other embodiments, one or more of the procedures, processes, and/or activities of method 400 can be combined or skipped. In some embodiments, portions of method 400 can be implemented by computer system 500 (FIG. 5).

A set of document vectors (such as those assigned in method 300) are accepted as an input (block 402). The set can include document vectors, media file vectors, metadata vectors, combinations of vectors, and the like. For each user, analytics are performed to determine the user's preferences (block 404). An embodiment can use one of a wide variety of techniques for this process. For example, a clustering technique, such as K-means clustering, can be performed to a cluster analysis. Any one of variety of data mining or machine-learning techniques and algorithms can be used to examine a user's history and determine the user's preferences, to determine media that is more likely to be a match to the user's preferences. These preferences can be represented by a vector.

The user's configuration is received (block 406). This configuration can be of the type described above with respect to FIGS. 2A and 2B. The user is able to choose the variables of the documents that are recommended to him. The variables can be adjusted by range. For example, the user can adjust the difficulty range or other style attribute of articles or other media being presented to him. The user can adjust the point of view of the articles or other media being presented to him. The style configuration and the point of view configuration are each represented by a vector. The document vectors are shifted based on prior analytics and the user-configured vectors.

The point of view configuration can be adjusted based on category. Thus, for example, a user might select to view a wide variety of documents for some topics (such as climate change), because the user is very interested in that topic. But the user can select to view a narrower variety of documents regarding a different topic (for example, the user might be greatly interested in professional football, but not college football, and can limit his exposure to college football topics, but still view professional football topics).

There are several different manners in which the user can enter configuration information. In some embodiments, a graphical user interface can be used. In a similar manner to that shown in FIG. 2B, a user can adjust sliders on a graph to reflect the adjustments. In some embodiments, drop-down boxes, forms, and other commonly used interface features can be present to make adjustments.

These configurations can be similar to that described above with respect to FIG. 2B. The user can set one or more configuration parameters to determine which features are important to him and which features are not important. At block 408, for each vector in the set of vectors, the vector is shifted or recalculated based on prior analytics (such as those performed in block 404) and the user's configuration (such as those set in block 406).

New articles or media files are selected for the user (block 410). This selection can be performed in one of a variety of different manners. In some embodiments, articles and other documents are determined by calculating a similarity score between the newly shifted document vectors and the articles within the set of documents. A similarity score can be computed in one of a variety of different manners. In some embodiments, a cosine similarity between the newly shifted vector and articles within the set of documents can be computed, with only the most similar documents being selected.

The selected articles are presented to the user (block 412). The presentation can be performed in one of a variety of different manners. For example, there can be a "feed" of recommended articles that are shown to the user. The user can receive notifications or emails when newly recommended articles are available. Similar types of presentations are also possible.

While certain aspects of the description of method 400 make reference to articles, it should be understood that embodiments are not so limited. Instead of articles, there could be a wide variety of materials. In written work, the works could be articles, books, editorials, short stories, novellas, novels, abstracts, screenplays, research papers, patents, and the like. In the realm of non-written work, there can be video files, music files, images, and the like.

FIG. 5 depicts a high-level block diagram computer system 500, which can be used to implement one or more embodiments. More specifically, computer system 500 can be used to implement hardware components of systems capable of performing methods described herein. Although one exemplary computer system 500 is shown, computer system 500 includes a communication path 526, which connects computer system 500 to additional systems (not depicted) and can include one or more wide area networks (WANs) and/or local area networks (LANs) such as the Internet, intranet(s), and/or wireless communication network(s). Computer system 500 and additional system are in communication via communication path 526, e.g., to communicate data between them.

Computer system 500 includes one or more processors, such as processor 502. Processor 502 is connected to a communication infrastructure 504 (e.g., a communications bus, cross-over bar, or network). Computer system 500 can include a display interface 506 that forwards graphics, textual content, and other data from communication infrastructure 504 (or from a frame buffer not shown) for display on a display unit 508. Computer system 500 also includes a main memory 510, preferably random access memory (RAM), and can also include a secondary memory 512. Secondary memory 512 can include, for example, a hard disk drive 514 and/or a removable storage drive 516, representing, for example, a floppy disk drive, a magnetic tape drive, or an optical disc drive. Hard disk drive 514 can be in the form of a solid state drive (SSD), a traditional magnetic disk drive, or a hybrid of the two. There also can be more than one hard disk drive 514 contained within secondary memory 512. Removable storage drive 516 reads from and/or writes to a removable storage unit 518 in a manner well known to those having ordinary skill in the art. Removable storage unit 518 represents, for example, a floppy disk, a compact disc, a magnetic tape, or an optical disc, etc. which is read by and written to by removable storage drive 516. As will be appreciated, removable storage unit 518 includes a computer-readable medium having stored therein computer software and/or data.

In alternative embodiments, secondary memory 512 can include other similar means for allowing computer programs or other instructions to be loaded into the computer system. Such means can include, for example, a removable storage unit 520 and an interface 522. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 520 and interfaces 522 which allow software and data to be transferred from the removable storage unit 520 to computer system 500.

Computer system 500 can also include a communications interface 524. Communications interface 524 allows software and data to be transferred between the computer system and external devices. Examples of communications interface 524 can include a modem, a network interface (such as an Ethernet card), a communications port, or a PC card slot and card, a universal serial bus port (USB), and the like. Software and data transferred via communications interface 524 are in the form of signals that can be, for example, electronic, electromagnetic, optical, or other signals capable of being received by communications interface 524. These signals are provided to communications interface 524 via communication path (i.e., channel) 526. Communication path 526 carries signals and can be implemented using wire or cable, fiber optics, a phone line, a cellular phone link, an RF link, and/or other communications channels. one or more one or more one or more one or more one or more one or more one or more one or more one or more one or more one or more one or more one or more one or more In the present description, the terms "computer program medium," "computer usable medium," and "computer-readable medium" are used to generally refer to media such as main memory 510 and secondary memory 512, removable storage drive 516, and a hard disk installed in hard disk drive 514. Computer programs (also called computer control logic) are stored in main memory 510 and/or secondary memory 512. Computer programs also can be received via communications interface 524. Such computer programs, when run, enable the computer system to perform the features discussed herein. In particular, the computer programs, when run, enable processor 502 to perform the features of the computer system. Accordingly, such computer programs represent controllers of the computer system. Thus it can be seen from the forgoing detailed description that one or more embodiments provide technical benefits and advantages.

Figure 6:
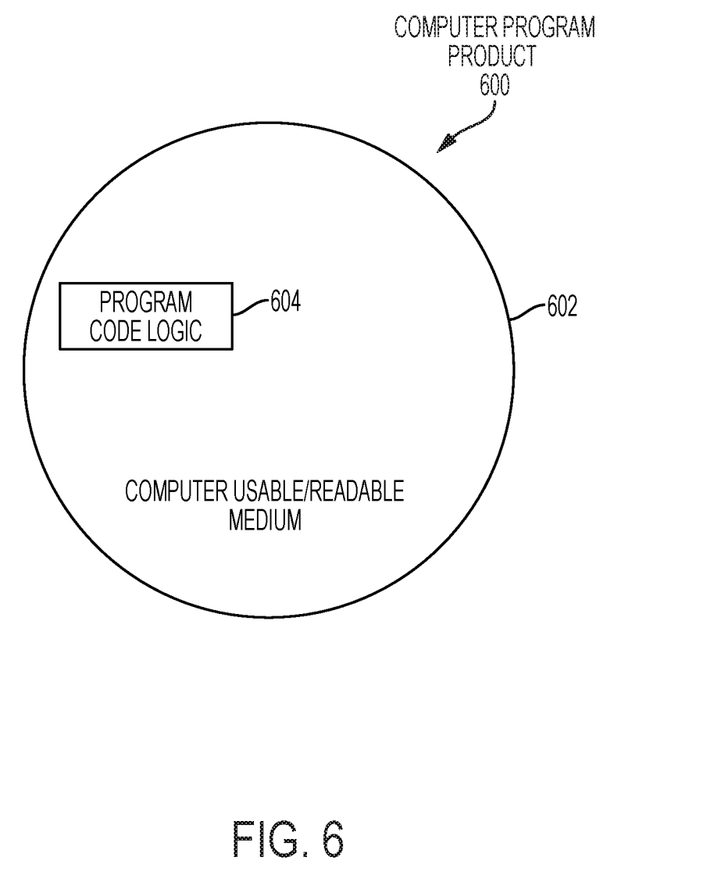
FIG. 6 depicts a diagram of a computer program product according to one or more embodiments.

Referring now to FIG. 6, a computer program product 600 in accordance with an embodiment that includes a computer-readable storage medium 602 and program instructions 604 is generally shown.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but is not intended to be exhaustive or limited. Many modifications and variations will be apparent to those of ordinary skill in the art without departing from the scope and spirit of embodiments of the invention. The embodiment was chosen and described in order to best explain the principles of operation and the practical application, and to enable others of ordinary skill in the art to understand embodiments of the present invention for various embodiments with various modifications as are suited to the particular use contemplated.

What is claimed is:

1. A computer implemented method of allowing the discoverability of media files comprising:
    analyzing, using a processor, a set of media files;
    representing, using the processor, each media file in the set of media files as a media file vector according to characteristics of each media file by analyzing, using the processor, content of the media file along a plurality of vector dimensions, wherein the plurality of vector dimensions include a point of view of the media file, a length of the media file, and a Flesch-Kincaid readability score of the media file;
    determining, using the processor, a set of preferences for a user, wherein the set of preferences for the user are obtained by applying a machine-learning algorithm to a history of the user;
    receiving, using the processor, a configuration from the user, wherein the configuration includes a user selected range for each of the plurality of vector dimensions;
    shifting, using the processor, each media file vector based on the set of preferences and the configuration;
    selecting, using the processor, one or more media files for presentation to the user based on the user's preferences and configuration,
    wherein at least one of the plurality of vector dimensions are obtained by the analyzing: language difficulty, domain, sentiment, opinion, topic, and tone.

2. The computer implemented method of claim 1, wherein:
    each of the one or more media files comprises a written work.

3. The computer implemented method of claim 2, wherein:
    the plurality of vector dimensions further includes bibliographic information about the written work.

4. The computer implemented method of claim 1, wherein:
    the media file is an audio, image, or video file; and
    the vector dimensions include bibliographic information determined by analyzing the audio, image, or video file.

5. The computer implemented method of claim 1, wherein:
    at least one of the vector dimensions represents a style of the media file; and
    receiving the configuration from the user comprises:
        receiving a user's style configuration;
        receiving a user's point of view configuration; and
        creating a configuration vector from the user's style configuration and the user's point of view configuration.

6. The computer implemented method of claim 5, wherein:
    selecting one or more media files for presentation to the user based on the user's preferences and configuration comprises:
        calculating, using the processor, a similarity score between the user's configuration vector and the media file's vector, for each media file; and
        selecting one or media files based on the similarity score.

7. The computer implemented method of claim 5, wherein calculating the similarity score comprises calculating a cosine similarity score.

8. The computer implemented method of claim 1 further comprising:
    causing the display of the selected one or media files to the user.

9. A computer system for allowing the discoverability of media files comprising:
    a memory; and
    a processor system communicatively coupled to the memory;
    the processor system configured to perform a method comprising:
        analyzing a set of media files;
        representing each media file in the set of media files as a media file vector according to characteristics of each media file by analyzing, using the processor, content of the media file along plurality of vector dimensions, wherein the plurality of vector dimensions include a point of view of the media file, a length of the media file, and a Flesch-Kincaid readability score of the media file;
        determining a set of preferences for a user, wherein the set of preferences for the user are obtained by applying a machine-learning algorithm to a history of the user;
        receiving a configuration from the user, wherein the configuration includes a user selected range for each of the plurality of vector dimensions;

shifting each media file vector based on the set of preferences and the configuration; and
selecting one or more media files for presentation to the user based on the user's preferences and configuration,
wherein at least one of the plurality of vector dimensions are obtained by the analyzing: language difficulty, domain, sentiment, opinion, topic, and tone.

10. The computer system of claim 9, wherein:
each of the one or more media files comprises a written work.

11. The computer system of claim 10, wherein:
the plurality of vector dimensions further includes bibliographic information about the written work.

12. The computer system of claim 9, wherein:
the media file is an audio, image, or video file; and
the vector dimensions include bibliographic information determined by analyzing the audio, image, or video file.

13. The computer system of claim 9, wherein:
at least one of the vector dimensions represents a style of the media file; and
receiving the configuration from the user comprises:
 receiving a user's style configuration;
 receiving a user's point of view configuration; and
 creating a configuration vector from the user's style configuration and the user's point of view configuration.

14. The computer system of claim 13, wherein:
selecting one or more media files for presentation to the user based on the user's preferences and configuration comprises:
 calculating, using the processor system, a similarity score between the user's configuration vector and the media file's vector, for each media file; and
 selecting the one or media files based on the similarity score.

15. A computer program product of allowing the discoverability of media files comprising:
a computer-readable storage medium having program instructions embodied therewith, wherein the computer-readable storage medium is not a transitory signal per se, the program instructions readable by a processor system to cause the processor system to perform a method comprising:
analyzing a set of media files;
representing each media file in the set of media files as a media file vector according to characteristics of each media file by analyzing, using the processor, content of the media file along a plurality of vector dimensions, wherein the plurality of vector dimensions include a point of view of the media file, a length of the media file, and a Flesch-Kincaid readability score of the media file;
determining a set of preferences for a user, wherein the set of preferences for the user are obtained by applying a machine-learning algorithm to a history of the user;
receiving a configuration from the user, wherein the configuration includes a user selected range for each of the plurality of vector dimensions;
shifting each media file vector based on the set of preferences and the configuration; and
selecting one or more media files for presentation to the user based on the user's preferences and configuration,
wherein at least one of the plurality of vector dimensions are obtained by the analyzing: language difficulty, domain, sentiment, opinion, topic, and tone.

16. The computer program product of claim 15, wherein:
each of the one or more media files comprises a written work.

17. The computer program product of claim 16, wherein:
the plurality of vector dimensions further includes bibliographic information about the written work.

\* \* \* \* \*